US006137808A

United States Patent [19]

Enokido

[11] Patent Number: 6,137,808

[45] Date of Patent: Oct. 24, 2000

[54] RECEIVER FOR RECEIVING TEXT-BASED MULTIPLEX BROADCASTS

[75] Inventor: Ryuichi Enokido, Tokyo, Japan

[73] Assignee: Sony Corporation, Tokyo, Japan

[21] Appl. No.: 08/972,472

[22] Filed: Nov. 18, 1997

[30] Foreign Application Priority Data

Nov. 27, 1996 [JP] Japan .................................... 8-331538

[51] Int. Cl.[7] ................................ H04H 1/04; H04B 1/16

[52] U.S. Cl. ........................................ 370/486; 455/158.4

[58] Field of Search ............................... 455/260, 39, 42, 455/158.4, 158.5, 186.1; 358/335, 142; 375/216, 219, 220; 704/260; 370/535, 537, 542, 310, 277, 486, 487

[56] References Cited

U.S. PATENT DOCUMENTS 5,260,788 11/1993 Takano et al. .......................... 358/142
5,390,027 2/1995 Henmi et al. ........................... 358/335
5,581,576 12/1996 Lanzetta et al. ........................ 375/216
5,710,994 1/1998 Shiota ..................................... 455/260
5,722,047 2/1998 Murayama ................................ 455/45
5,845,248 12/1998 Nishida et al. ......................... 704/260
5,857,149 1/1999 Suzuki ................................. 455/186.1
5,867,776 2/1999 Noda ................................... 455/186.1

*Primary Examiner*—Chau Nguyen
*Assistant Examiner*—Chiho Andrew Lee
*Attorney, Agent, or Firm*—Jay H. Maioli

[57] ABSTRACT

An FM text-based multiplex receiver has a plurality of preset keys. A display device displays a text-based program. A storage device stores selected broadcast data and corresponding text-based program data in a data area corresponding to the operated preset key. When a particular preset key is operated, the receiver reads data for specifying the broadcast station and data for specifying the text-based program from the data area corresponding to the operated preset key and causes the display device to display the text-based program of the broadcast station in accordance with the read data.

4 Claims, 9 Drawing Sheets

| KEY | DATA: AREA MODE MFLG = "0" | DATA: MY MEMORY MODE MFLG = "1" | |
|---|---|---|---|
| P1 | N11 | N21, D21 | A11, A21 |
| P2 | N12 | N22, D22 | A12, A22 |
| P3 | N13 | N23, D23 | A13, A23 |
| P4 | N14 | N24, D24 | A14, A24 |
| P5 | N15 | N25, D25 | A15, A25 |
| P6 | N16 | N26, D26 | A16, A26 |
| P7 | N17 | N27, D27 | A17, A27 |
| | A11 ~ A17 | A21 ~ A27 | |

FIG. 9

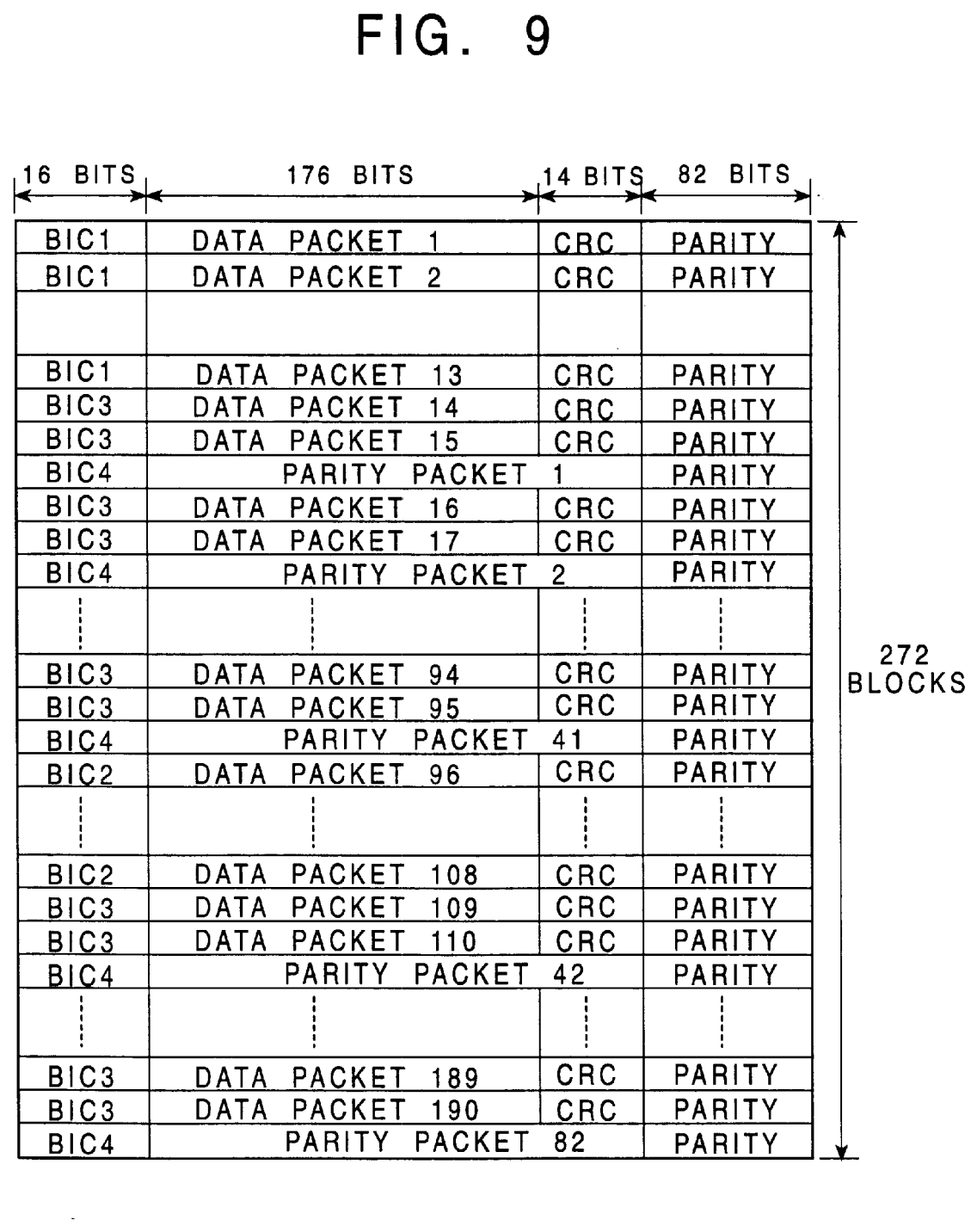

| 16 BITS | 176 BITS | 14 BITS | 82 BITS |
|---|---|---|---|
| BIC1 | DATA PACKET 1 | CRC | PARITY |
| BIC1 | DATA PACKET 2 | CRC | PARITY |
| | | | |
| BIC1 | DATA PACKET 13 | CRC | PARITY |
| BIC3 | DATA PACKET 14 | CRC | PARITY |
| BIC3 | DATA PACKET 15 | CRC | PARITY |
| BIC4 | PARITY PACKET 1 | | PARITY |
| BIC3 | DATA PACKET 16 | CRC | PARITY |
| BIC3 | DATA PACKET 17 | CRC | PARITY |
| BIC4 | PARITY PACKET 2 | | PARITY |
| ⋮ | ⋮ | ⋮ | ⋮ |
| BIC3 | DATA PACKET 94 | CRC | PARITY |
| BIC3 | DATA PACKET 95 | CRC | PARITY |
| BIC4 | PARITY PACKET 41 | | PARITY |
| BIC2 | DATA PACKET 96 | CRC | PARITY |
| ⋮ | ⋮ | ⋮ | ⋮ |
| BIC2 | DATA PACKET 108 | CRC | PARITY |
| BIC3 | DATA PACKET 109 | CRC | PARITY |
| BIC3 | DATA PACKET 110 | CRC | PARITY |
| BIC4 | PARITY PACKET 42 | | PARITY |
| ⋮ | ⋮ | ⋮ | ⋮ |
| BIC3 | DATA PACKET 189 | CRC | PARITY |
| BIC3 | DATA PACKET 190 | CRC | PARITY |
| BIC4 | PARITY PACKET 82 | | PARITY |

272 BLOCKS

RECEIVER FOR RECEIVING TEXT-BASED MULTIPLEX BROADCASTS

BACKGROUND OF THE INVENTION

1. Field of the Invention

The present invention relates to an FM receiver for receiving text-based multiplex broadcasts.

2. Description of the Related Art

In FM broadcasting, for example, in Japan, what is referred to as "the FM text-based broadcasting", in which data, such as character information, is multiplexed and transmitted with a normal sound broadcast program, has been implemented.

The above FM text-based broadcasting is referred to as "the data radio channel (DARC) system", which has been developed by NHK Science & Technical Research Laboratories. In this DARC system, digital-data, such as character-information, multiplexing standards are as follows.

Sub-carrier frequency: 76 kHz
Transmission rate: 16 kbits/second
Modulation method: level controlled minimum shift keying (LMSK)
Error correcting system: (272,190) product code by compacted differential-set cyclic codes An LMSK signal is frequency-multiplexed with an audio signal (monoral signal or a stereo composite signal) of a main sound broadcasting program, and the frequency-multiplexed signal is then transmitted.

The program services, such as character information, are differentiated by Levels 1, 2 and 3, all of the levels displaying (presenting) character information in the form of dots. Level 1 is a service targeted for FM receivers which are capable of displaying 15.5 characters×2.5 lines, including a header, and the information given by this level includes characters. Level 2 is a service aimed for FM receivers which can display 15.5 characters×8.5 lines, and the information presented by this level includes characters and graphics. Further, level 3 is a service provided for FM receivers which are capable of displaying detailed maps by means of CD-ROMs, i.e., level 3 is a traffic information service for a navigation system.

The program services at level 1 may include news, weather forecasts, traffic information, entertainment, major complementary programs, etc. Among the above services, entertainment services provide fortune-telling, listener's messages, quizzes, town information, and so on.

Further, the major complementary programs provide complementary information for main programs. For example, if a main sound broadcasting program is a music program, the complementary program provides the music titles, the performers, and the telephone and FAX numbers, which enable the listener to make a request. The major complementary programs will be hereinafter referred to as "the program information" or "the sub-program".

In addition to the above-described program services, "emergency information" may be provided as required in the case of emergency.

Data Configuration

FIG. 9 illustrates the layout of a frame of a data signal to be multiplexed according to the foregoing DARC-system FM text-based multiplex broadcasting. One frame of this signal consists of 272 blocks, and each block has 288 bits. The 272 blocks are divided into 190 data packet blocks and 82 vertical parity packet blocks, the vertical parity packet blocks being distributed and transmitted in the frame.

A 16-bit block identity code (BIC) is added at the head of each block. Four types of BICs are used to differentiate the parity packets and also to identify the head of a frame.

A BIC is followed by a 176-bit data packet, a 14-bit cyclic redundancy check (CRC) code, and a horizontal 82-bit parity check code. The CRC code is added for detecting residual errors after performing error corrections with product codes. Each vertical parity packet block has a 272-bit vertical parity packet preceded by the BIC.

Further, each data packet consists of a 32-bit prefix and a 144-bit data block, as shown in FIG. 10. The prefix is formed of a service identity code, a decode identity flag, an information end flag, an update flag, a data group number, a page number, a data link code, and a data packet number.

The service identity code is 4-bit data and is used for identifying the content of a program. The service identity code at level 1 includes:

0: undefined
1: general information for sequential-receiving processing
2: general information for record-receiving processing
4: traffic information Sequential-receiving processing is a mode in which a decoding operation for displaying a program is started upon receiving the first data packet of program data or page data by a FM receiver. The sequential-receiving processing mode is employed for the programs when a transmitting terminal should provide time to display data in a receiving terminal or for the programs when it is too late to perform a decoding operation after the final packet of a data group has been obtained in a receiving terminal.

In contrast, record-receiving processing is a mode in which a decoding operation is started only after all of the data packets of program data or page data have been received and after an error-correcting operation has been performed on each data group by using CRC codes. Thus, the display timing of text-based programs using the record-receiving processing mode can be controlled by a FM receiver.

In the prefix of a data packet, the decode identity flag is set to be "1" when the error correcting circuit of a FM receiver outputs data which has been decoded only in the horizontal direction. On the other hand, the decode identity flag is set to be "0" when the error correcting circuit outputs data which has been decoded both in the vertical and horizontal directions.

In sequential-receiving processing, if the decode identity flag is "0", it is determined that an FM receiver begins to perform a decoding operation on the first data packet upon receiving the BIC at the head of the 302nd data packet after receiving the BIC at the head of the first data packet.

The information end flag is set to be "1" when a data group represented by a data group number has been transmitted, and it is set to be "0" at other occasions. Moreover, the update flag is incremented by one every time a data group is updated.

The data group number consists of a program number and a page number. The program number has 8 bits and ranges from 0 to 255, which are allocated as follows.

0: table of contents (main menu)
1–253: general text-based programs (news, weather forecasts, etc.)
254: major complementary programs (program information or sub-program)
255: emergency information The page number has 6 bits ranging from 1 to 62, i.e., one program has a maximum of 62 pages. One page corresponds to one data group, and one data group is formed of one or a plurality of data blocks.

Further, the data link code of the prefix is used for the following purpose. Data which originally belongs to one data group is divided into a maximum of four data-group portions, because, for example, the data contains a large capacity with the number of packets exceeding the maximum data packet number. Then, the divided portions of data are provided with different data link codes, such as the link 0→1→2→3, and are transmitted using the same data group number. Moreover, the data packet numbers are sequentially allocated from 0.

The data format according to the DARC system has thus been explained. Since the data transmission rate is 16 kbits/second and the frame size is 288 bits×272 blocks, the time required for broadcasting or transmitting one frame of data is slightly less than 5 seconds (=288 bits×272 blocks/16 kbits per second).

Example of Displaying a Text-based Program

An FM receiver corresponding to level 1 is, as illustrated in FIG. 7, provided with a display device DSP, such as a liquid crystal display (LCD) and has a display area 50 of 15.5 characters×2.5 lines (248-dot columns and 40-dot rows). The display area 50 is formed of a 0.5-line upper portion, i.e., a header display portion 50*a,* and a 2-line lower portion, i.e., a body display portion 50*b.*

When the FM receiver receives a text-based multiplex broadcast program, the first page of the table of contents is displayed, as shown in FIG. 8A/FIG. 12A, in the display area 50 of the display device DSP. Upon performing a predetermined key operation while the first page is displayed, the second page is displayed in the display area 50, as illustrated in FIG. 8B/FIG. 12B. Similarly, the other pages of the table of contents are sequentially displayed, as shown in FIGS. 8C/FIG. 12C through 8E/FIG. 12E.

The table of contents includes programs in a hierarchical form. For example, if "3. Weather Forecasts" is selected from the table of contents shown in FIG. 8B/FIG. 12B, the contents of the programs, which are one level lower than the contents shown in FIG. 8B/FIG. 12B, such as "1. Today's Weather" and "2. Tomorrow's Weather", are displayed, as illustrated in FIG. 8C/FIG. 12C. If "2. Tomorrow's Weather", for example, is further selected, "Tomorrow's Weather Forecasts in Tokyo", which is the first page of the program one level lower than the contents shown in FIG. 8C/FIG. 12C, is displayed, as illustrated in FIG. 8D/FIG. 12D. At this time, if the second page is selected, "Tomorrow's Weather Forecasts in Kanagawa" is displayed, as shown in FIG. 8E/FIG. 12E.

In this manner, the programs are sequentially selected from the hierarchical table of contents in order to display a desired text-based program.

With the above arrangement, however, it is necessary to trace a plurality of programs from the first page of the table of contents in order to display a desired text-based program. This further requires a plurality of key operations.

For example, even for displaying text-based programs which are relatively frequently accessed, such as weather forecasts, many key operations are required as follows:

(1) displaying the table of contents;

(2) selecting "3. Weather Forecasts";

(3) selecting "2. Tomorrow's Weather"; and (4) selecting "Tomorrow's Weather Forecasts in Kanagawa".

This lowers the ease of operation. Further, if the key operation is erroneously performed, it is necessary to return the display area 50 to the first page of the table of contents and then to start the key operation again from the first page, thereby lowering the efficiency in tracing a desired text-based program.

SUMMARY OF THE INVENTION

Accordingly, it is an object of the present invention to solve the foregoing problem.

In order to achieve the above object, there is provided an FM receiver for receiving a text-based multiplex broadcast in which text-based program data is multiplexed with a main sound broadcast program signal and a resulting multiplex signal is broadcast. The FM receiver includes a receiving circuit for receiving the text-based multiplex broadcast. A decoder circuit extracts the text-based program data from the text-based multiplex broadcast received by the receiving circuit. A display device displays information concerning the text-based program data. The receiver also has a plurality of preset keys, and a storage device for storing in a data area data concerning a broadcast station broadcasting a selected broadcast and text-based program data. When one of the plurality of preset keys is operated during a preset operation for selecting a broadcast station and information concerning the text-based program of the selected broadcast is displayed on the display device, control means stores data for specifying the selected broadcast station and data for specifying the displayed text-based program in a data area of the storage device corresponding to the operated preset key. Further, when a particular preset key is operated from the plurality of preset keys to receive the preset text-based program, the control means reads data for specifying the selected broadcast and data for specifying the text-based program from the data area corresponding to the operated preset key, thereby causing the display device to display the text-based program of the selected broadcast station in accordance with the read data.

With this configuration, a desired text-based program is selected and displayed by a simple key operation.

BRIEF DESCRIPTION OF THE DRAWINGS

FIG. 9 illustrates a data signal format;

DESCRIPTION OF THE PREFERRED EMBODIMENT

As is seen from the description of the related art, since each text-based program is provided with a service identity code and a program number, the service identity code and the program number can be checked to determine the corresponding text-based program.

Focused on the above characteristics, the present invention has been completed as follows. A text-based program is preset for a preset key, and upon pressing the preset key, the corresponding text-based program is displayed.

The present invention will now be explained in greater detail through illustration of a preferred embodiment with reference to the drawings.

Configuration

Figure 1:
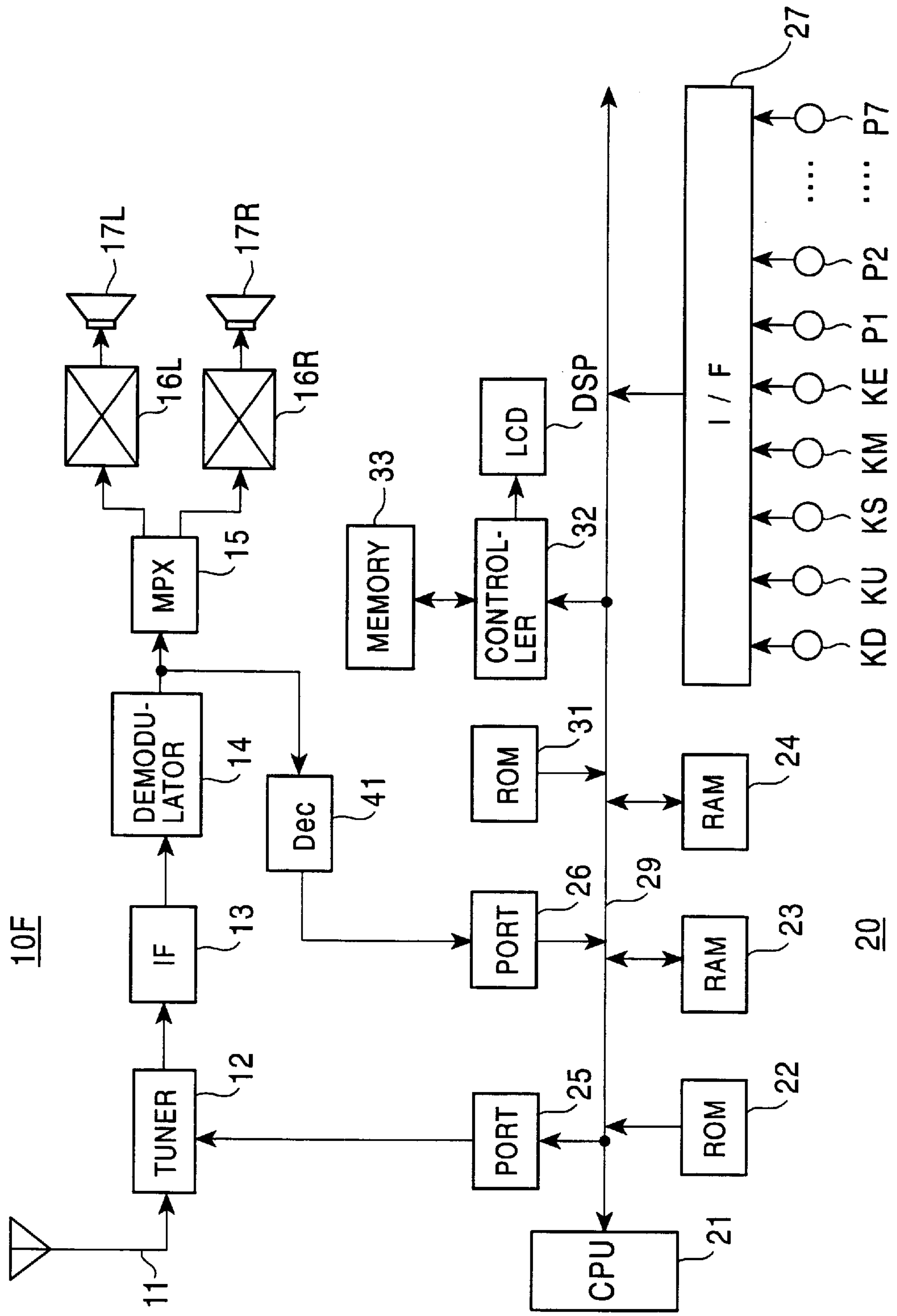
FIG. 1 is a block diagram illustrating an embodiment of the present invention.

FIG. 1 is an block diagram of a FM receiver which is capable of receiving programs at level 1. In this receiver, a maximum of seven broadcast stations can be preset, and a maximum of seven text-based programs can be registered.

More specifically, in an FM receiving circuit generally designated by 10F, FM signals received by an antenna 11 are supplied to a tuner circuit 12 which is operable according to the synthesizer method. In the tuner circuit 12, a desired broadcast station using a particular frequency is selected, and the FM signal corresponding to the selected broadcast station is converted into an intermediate frequency (IF) signal. The IF signal is then fed to an FM demodulation circuit 14 via an intermediate frequency circuit 13 having an intermediate frequency filter and a wide-band amplifier.

Extracted from the demodulation circuit 14 is a frequency multiplex signal with a combination of an added (L+R) signal of audio signals L and R on the left and right stereo channels respectively, a double-sideband (DSB) signal that has been balance-modulated by a difference (L−R) signal of the audio signals L and R, a pilot signal, and an LMSK signal used in the foregoing FM text-based multiplex broadcasting.

The frequency multiplex signal is supplied to a stereo demodulation circuit 15 in which the audio signals L and R are demodulated from the added (L+R) signal and the DSB signal. The demodulated audio signals L and R are fed to respective speakers 17L and 17R of the left and right channels via amplifiers 16L and 16R, respectively.

A microcomputer generally indicated by 20, which serves as control means, is further provided for the FM receiver in order to enable the tuner circuit 12 to select a desired station and to display characters using the FM text-based multiplex broadcasting. As the microcomputer 20, a 4-bit microcomputer UPD17073 produced by NEC Corporation is used.

More specifically, the microcomputer 20 has a CPU 21 for running programs, a ROM 22 for storing the programs, a RAM 23 used as a data area and a work area, and a RAM 24 used as a buffer for receiving FM text-based multiplex broadcast data. The storage devices 22, 23 and 24 are connected to the CPU 21 via a system bus 29.

Figure 2:
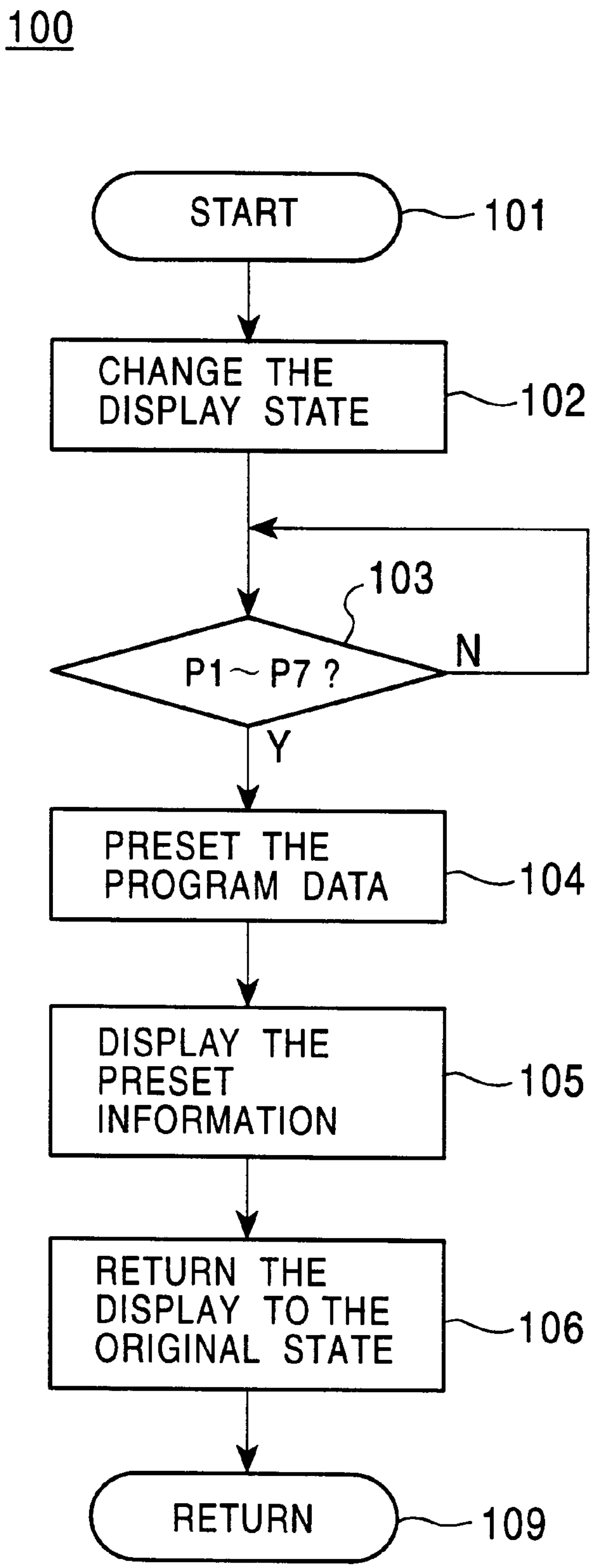
FIG. 2 is a flow chart illustrating an embodiment of the present invention.
Figure 3:
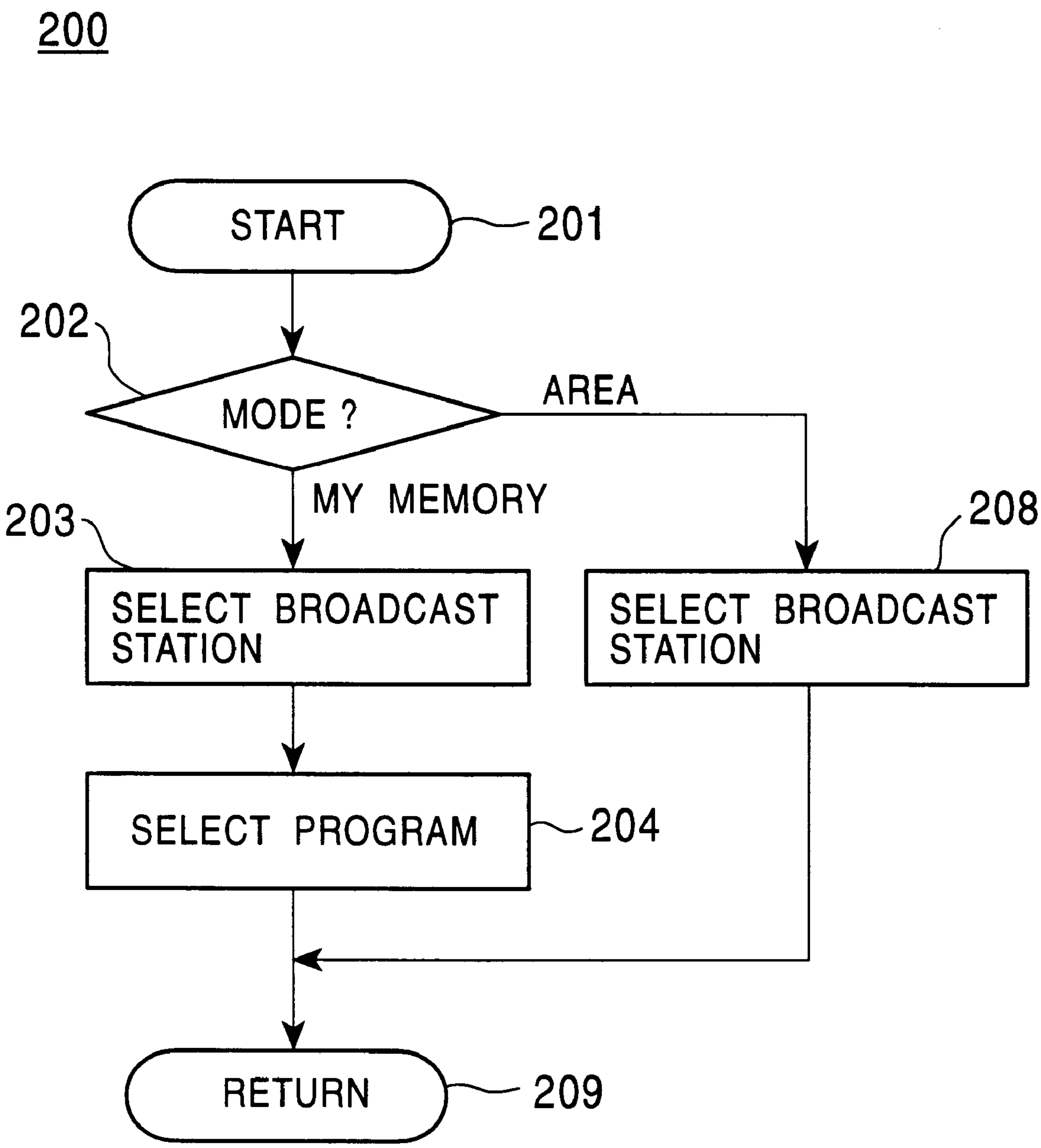
FIG. 3 is a flow chart illustrating an embodiment of the present invention.

Stored in the ROM 22 are various routines, for example, a text-based program preset routine 100 and a selection routine 200 shown in FIGS. 2 and 3, respectively. The preset routine 100 is used for registering information required for displaying a targeted text-based program, while the selection routine 200 is used for selecting a desired broadcast station or a desired text-based program with a single touch, though a detailed explanation of these routines 100 and 200 will be described later.

The ROM 22 also stores the following type of data. Japan is divided into 14 areas, such as "Hokkaido", "Tohoku 1", "Kyushu 2" and so on. The data concerning the frequencies used by the broadcast stations which are receivable by the 14 areas is stored in the ROM 22. The frequency data indicates, for example, the scaling ratio of a variable scaling-circuit of a phase-locked loop (PLL) which forms the tuner circuit 12.

Figures 4, 5:
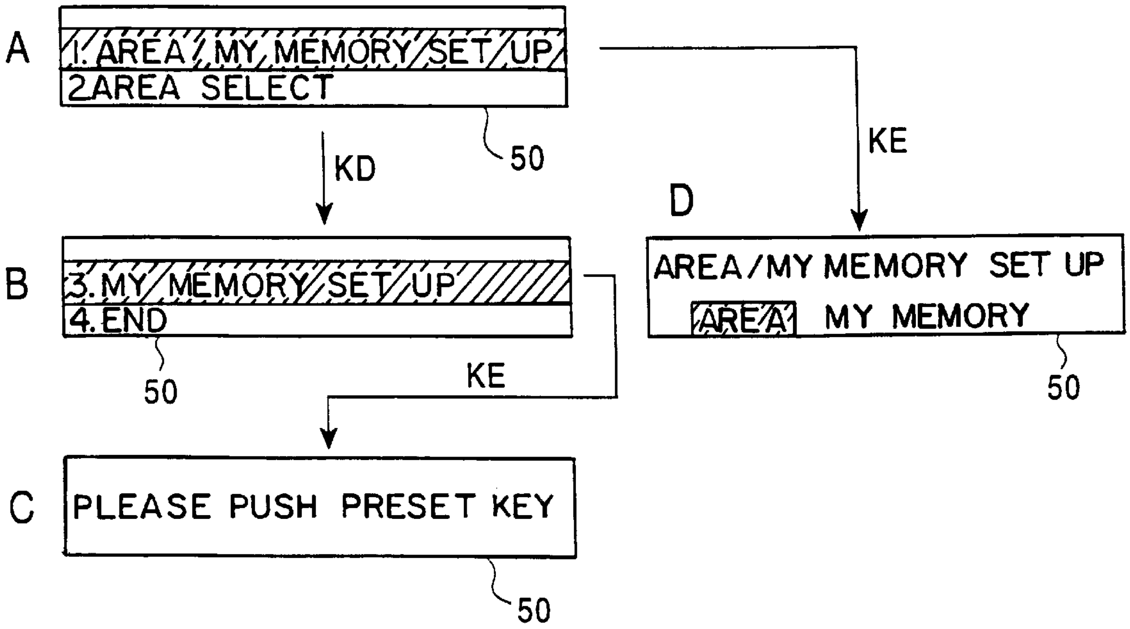
FIG. 4 illustrates a data table used in an embodiment of the present invention.
FIG. 5, which is comprised of FIGS. 5A through 5D, illustrates a display state according to an embodiment of the present invention.

The RAM 23 contains a data table DTBL, such as the one shown in FIG. 4. Since the FM receiver shown in FIG. 1 is able to preset a maximum of seven broadcast stations and a maximum of seven text-based programs, seven preset keys P1 through P7, are provided, which will be explained later. Seven sets of data areas (A11, A21) through (A17, A27), one set consisting of two items of data, corresponding to the preset keys P1 through P7, respectively, are further stored in the data table DTBL.

The mode flag MFLG is also stored in the data table DTBL. The data areas A11 through A17 correspond to the mode flag MFLG "0", while A21 through A27 are associated with the mode flag MFLG "1". In the following description, the MFLG "0" mode and the MFLG "1" mode will be referred to as the "area mode" and "my memory mode", respectively.

Transferred to the data areas A11 through A17 from the ROM 22 are frequency data N11 through N17 which are receivable by a particular area, selected from frequency data of a plurality of areas, stored in the ROM 22 (frequency data of the broadcast stations receivable by the 14 areas).

Further, stored in the data areas A21 through A27 are the frequency data N2m (m indicates one of the numbers 1 through 7) of a broadcast station which is preset for the m-th preset key Pm, and the program selection information D2m for specifying a particular program from the text-based programs which are broadcast by the selected broadcast station. For example, the frequency data N2m indicates the scaling ratio of the variable scaling circuit of the PLL which forms the tuner circuit 12, while the program selection information D2m designates data concerning the service identity code and the program number.

Referring back to FIG. 1, ports 25 and 26 and an interface circuit 27 are also connected to the bus 29, and station-selecting data is supplied to the tuner circuit 12 through the port 25 so as to allow the tuner circuit 12 to select a particular station. Moreover, a demodulation signal is supplied from the demodulation circuit 14 to a decoder circuit 41 in which the text-based program data is decoded from the LMSK signal and errors contained in the LMSK signal are corrected. Then, the decoded data is extracted from the decoder circuit 41 and is stored in the buffer RAM 24 via the port 26.

Further, various operation keys KD, KU, KS, KM and KE are connected to the interface circuit 27. A plurality of, for example, seven, preset keys P1 through P7 are also connected to the interface circuit 27.

The preset key Pm (m indicates one of the numbers 1 through 7), which serves as a normal preset key in the "area mode", can be pressed to instantly select a particular broadcast station. On the other hand, in "my memory mode", a particular preset text-based program can be selected with a single touch so as to be received and displayed. The keys KD through KE and P1 through P7 are formed of momentary-contact-type push switches.

Connected to the bus 29 is a font ROM (character generator) 31 having font data used for converting character data sent by FM text-based multiplex broadcasting into display data. A display controller 32 is also connected to the bus 29. A display memory 33 and a display device DSP, which is formed of a liquid crystal device, are further connected to the display controller 32.

Figure 7:
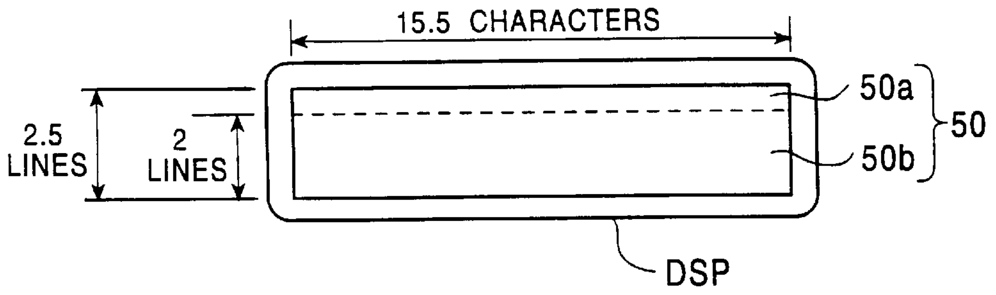
FIG. 7 illustrates a display screen according to an embodiment of the present invention.

The display device DSP, which displays characters by a combination of dots, is configured in a manner similar to, for example, the display device DSP shown in FIG. 7. The display area 50 has a size of 15.5 characters×2.5 lines (248-dot columns×40-dot rows). The display area 50 is formed of a 0.5-line upper portion (248-dot columns×8-dot rows), i.e., a header portion 50*a,* and the remaining 2-line (248-dot columns×32-dot rows) portion, i.e., a body portion 50*b*.

The memory 33 has a capacity of storing one frame according to the bit map method corresponding to the dot display method used in the liquid crystal device. The data temporarily stored in the buffer RAM 24 or the data stored in the ROM 22 is read out to the CPU 21, and the read data is converted into the display data by using the font data stored in the font ROM 31. The converted display data is then written into the memory 33 via the controller 32. At the same time, the controller 32 repeatedly reads the display data stored in the memory 33 and converts it into a display signal, which is then supplied to the display device DSP. In this manner, the characters represented by the character data read by the CPU 21 from the buffer RAM 24 or the ROM 22 are displayed on the display device DSP.

In the FM receiver constructed as described above, the process of selecting a particular station and displaying a particular program is executed as follows.

Selection of Functions or Modes

An explanation will now be given of a technique of selecting the functions and modes in order to receive and display broadcasts.

Figure 11:
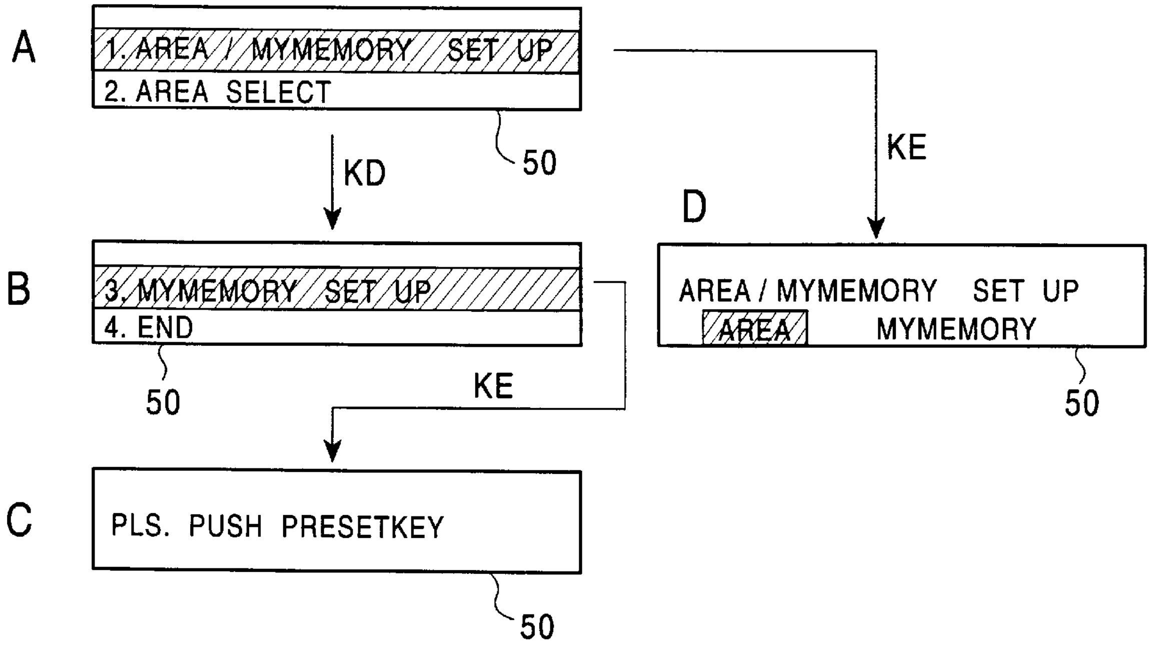
FIG. 11, which is comprised of FIGS. 11A through 11D, illustrates a display state indicated in English corresponding to the display state indicated in Japanese shown in FIG. 5.

Upon pressing the set-up key KS from the operation keys KD, KU, KS, KM, KE, a predetermined item of data is supplied to the memory 33 by the CPU 21 via the controller 32 so as to display, as illustrated in FIG. 5A/FIG. 11A, a mode-and-function set-up menu on the display device DSP. At the same time, the first menu item "1. area/my memory set-up" is highlighted, i.e., the cursor designates the first menu item (the highlighted items are indicated by the hatched portions in FIGS. 5, 6 and 11 for the convenience of drawings).

Then, upon pressing the down key KD or the up key KU from the keys KD, KU, KS, KM, KE, the position of the cursor (highlighted portion) indicated on the display device DSP is shifted downward or upward in accordance with the pressed key KD or KU. When the down key KD is pressed while the cursor is specifying the lower menu item of the first page, the menu proceeds to the subsequent page, as shown in FIG. 5B/FIG. 11B. In contrast, when the up key KU is pressed while the cursor is designating the upper menu item, the menu returns to the previous page. In this manner, the cursor can be located on a desired menu item by pressing the down key KD or the up key KU.

When a selection key KE is pressed from the keys KD, KU, KS, KM, KE while the cursor is positioned on a desired menu item, the routine for implementing the function or the mode designated by the cursor is performed as follows.

Set-up of Modes

The "area mode" or "my memory mode" selected as described above in order to receive a broadcast station or a broadcast program can be set by pressing the selection key KE while the cursor is positioned, as shown in FIG. 5A/FIG. 11A, on the first menu item "1. area/my memory set-up".

More specifically, upon pressing the selection key KE while the cursor is located on the menu item "1. area/my memory set-up", the predetermined data is supplied to the memory 33 to instruct the user to select the "area mode" or "my memory mode" on the display device DSP, as shown in FIG. 5D/FIG. 11D. FIG. 5D/FIG. 11D shows that the cursor is positioned on the "area mode".

The cursor is shifted to the position where a desired mode is indicated by pressing the down key KD or the up key KU, and then, the selection key KE is pressed. The mode flag MFLG is then set to be "0" or "1" in accordance with the selected mode, i.e., the "area mode" or "my memory mode", respectively. Subsequently, the display device DSP returns to the original state before performing processing of "selection of function" or "set-up of mode". The processing is then completed.

In this fashion, the mode flag MFLG can be set to be "0" or "1" by the key operation and the corresponding processing, i.e., the mode can be set either to the "area mode" or "my memory mode".

Presetting of Broadcast Station

In order to select a particular broadcast station only with a single touch of the preset key Pm in the "area mode", the corresponding station is preset for the preset key Pm by pressing the selection key KE while the cursor is positioned on the second menu item "2. selection of area", as illustrated in FIG. 5A/FIG. 11A.

More specifically, upon pressing the selection key KE when the cursor is located on the menu item "2. selection of area", the predetermined data is supplied to the memory 33 so as to display 14 divided area names, for example, "Hokkaido", "Tohoku 1", "Tohoku 2", and "Kyushu 2", on the display device DSP. The cursor is then shifted to the position where the area name corresponding to the FM receiver is indicated by operating the down key KD or the up key KU, and then, the selection key KE is pressed.

The frequency data items N11 through N17 of the broadcast stations receivable by the area designated by the cursor are read from the ROM 22 and written into the data areas A11 through A17, respectively, of the data table DTBL. Thereafter, the display device DSP returns to the original state before executing the processing of "selection of functions or modes" and "presetting of broadcast station". The processing is thus completed.

In this manner, the broadcast stations receivable by a particular area can be preset for the preset keys P1 through P7 by the above key operations and the corresponding processing.

Selection of Preset Broadcast Station

In the "area mode", the broadcast station preset for the preset key Pm is instantly selected in the following manner by pressing the preset key Pm.

More specifically, a particular preset key Pm is pressed to read the frequency data N1m corresponding to the preset key Pm stored in the data area A1m of the data table DTBL. The read frequency data N1m is then supplied to the tuner circuit 12 via the port 25, and the frequency indicated by the frequency data N1m is set in the tuner circuit 12 as the receiving frequency. Thus, the broadcast station preset for the preset key Pm can be instantly selected.

Display of Text-based Program (Normal Method)

Figure 6:
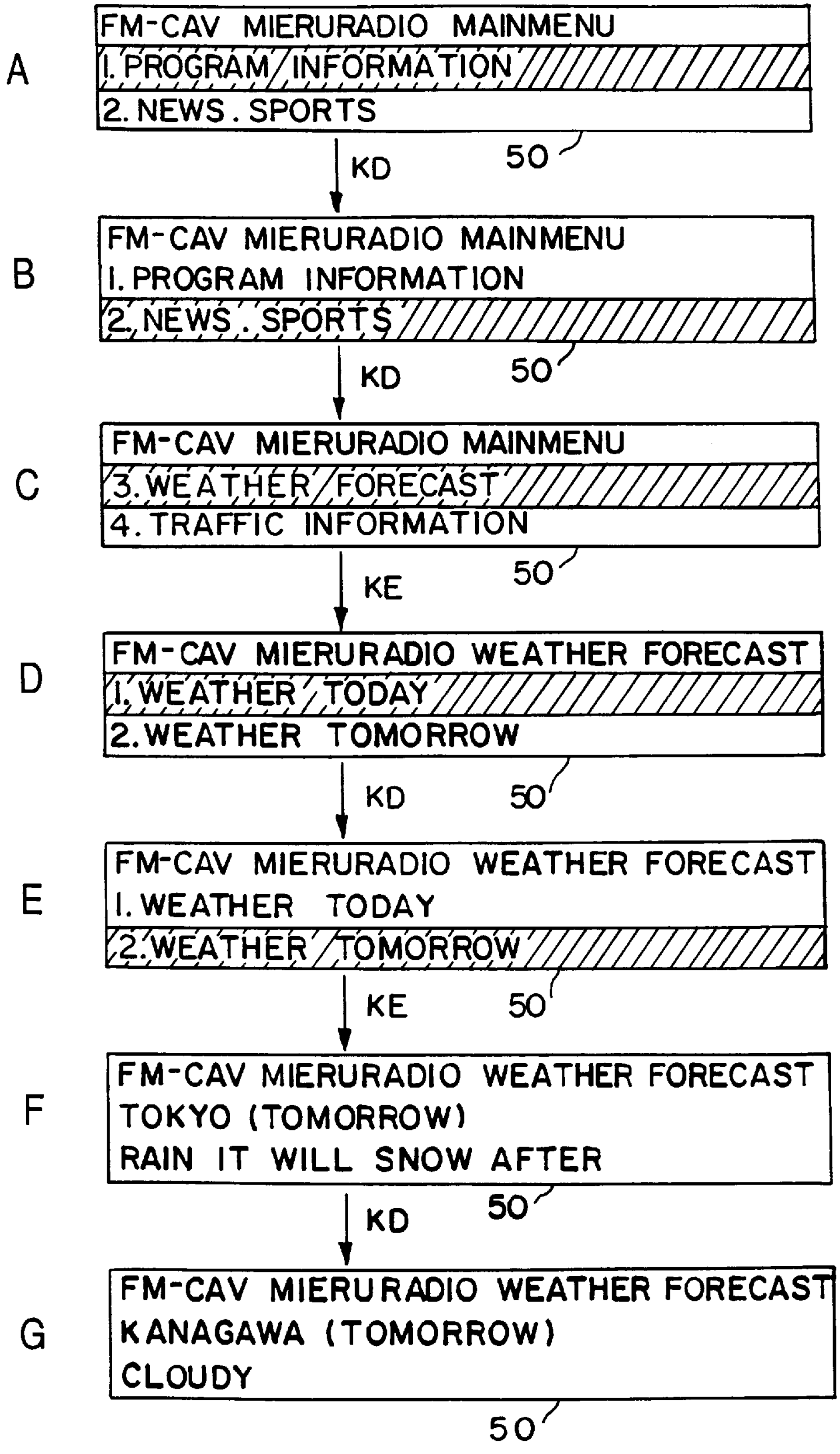
FIG. 6, which is comprised of FIGS. 6A through 6G, illustrates a display state according to an embodiment of the present invention.
Figure 8:
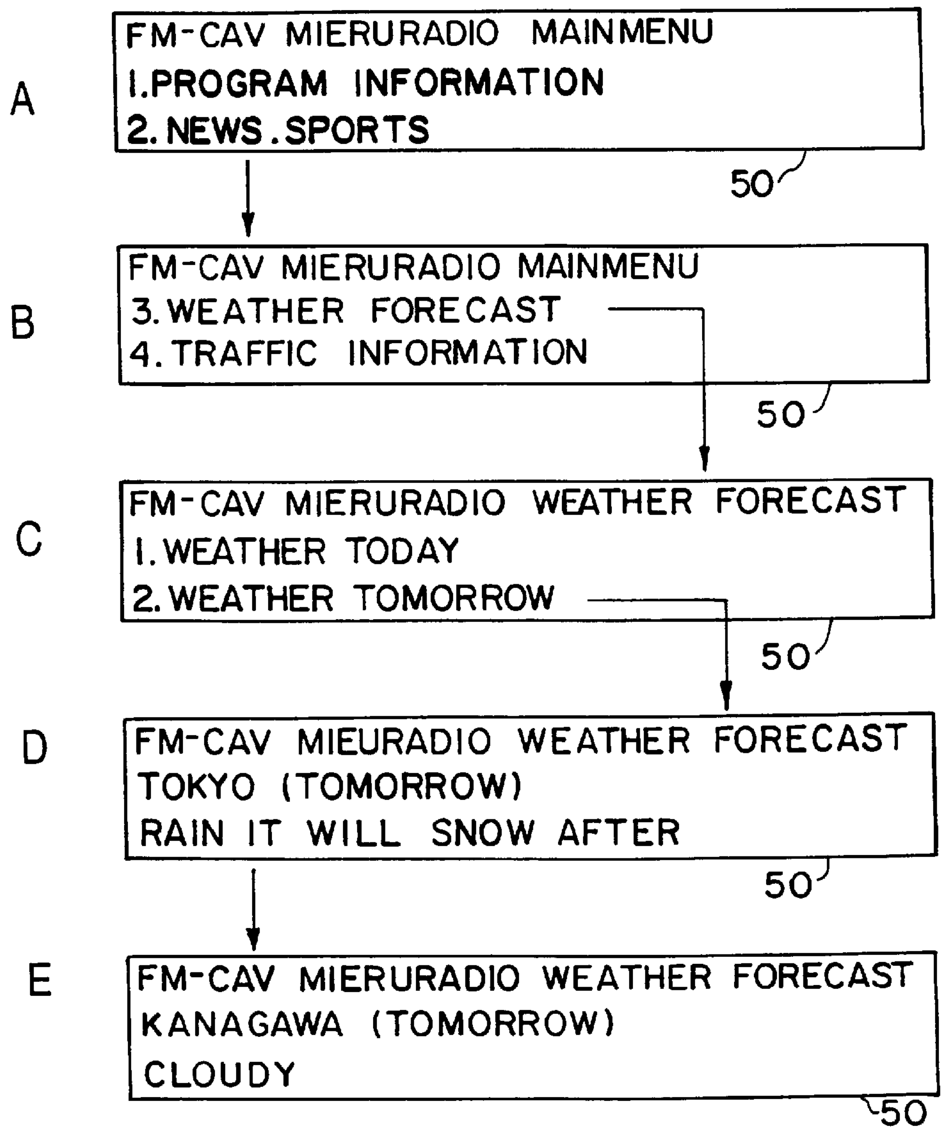
FIG. 8, which is comprised of FIGS. 8A through 8E, illustrates a display state according to an embodiment of the present invention.
Figure 10:
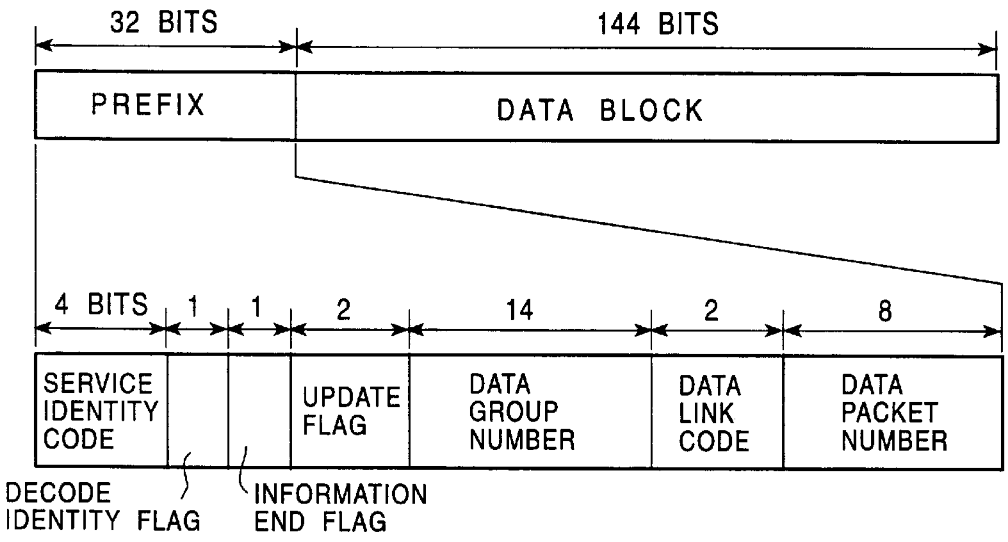
FIG. 10 illustrates a data signal format.
Figure 12:
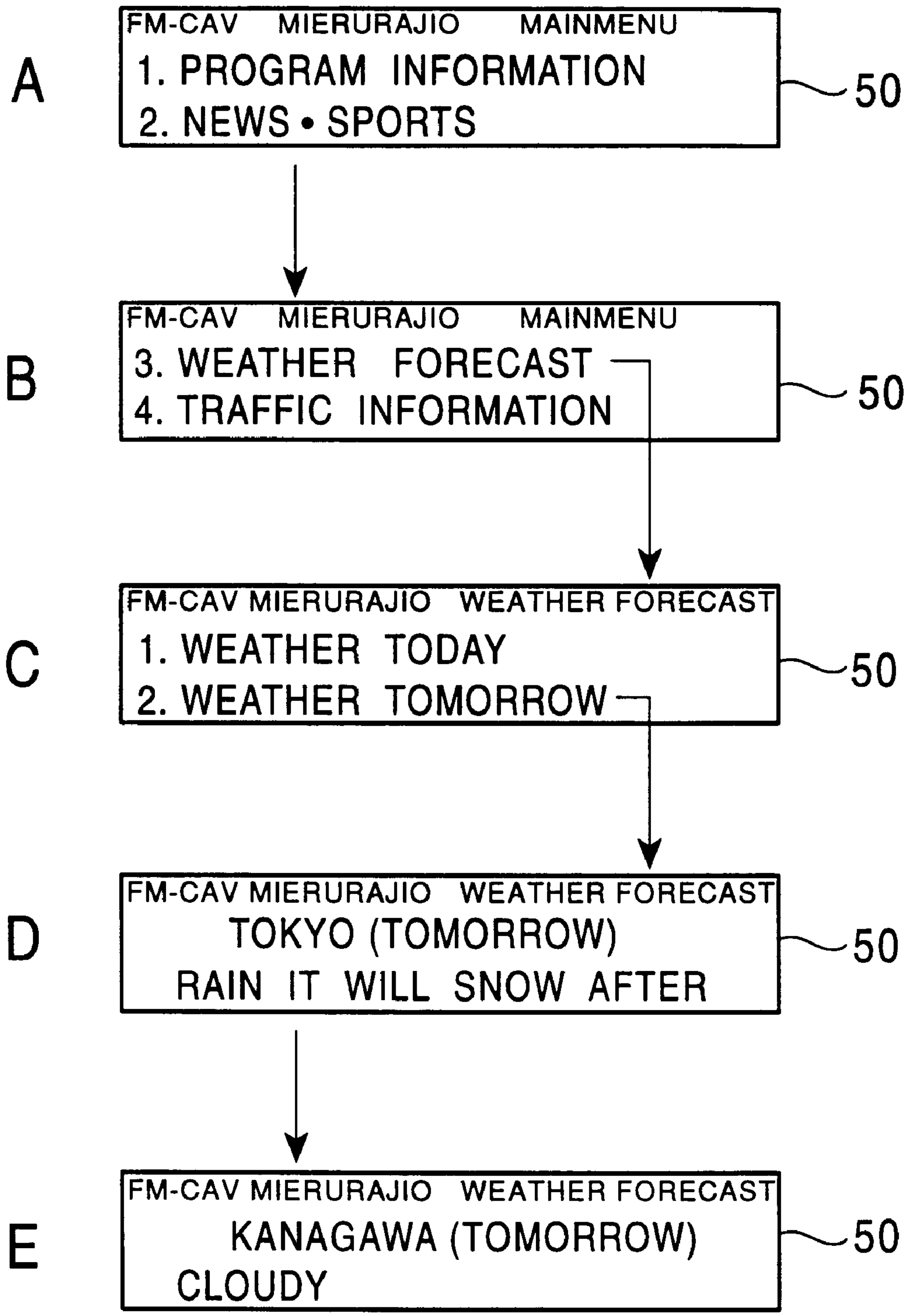
FIG. 12, which is comprised of FIGS. 12A through 12E, illustrates a display state indicated in English corresponding to the display state indicated in Japanese shown in FIG. 8.

In the "area mode" or "my memory mode", a desired text-based program is displayed in the following manner according to a normal method. An explanation will now be given of this method with reference to FIG. 6, which corresponds to FIG. 8/FIG. 12, when "Tomorrow's Weather Forecasts in Kanagawa", for example, is to be displayed, as shown in FIG. 6G.

According to the foregoing technique of selecting the preset broadcast station, the broadcast station broadcasting the desired text-based program is selected by the preset key Pm, and then, the text-based broadcast menu key KM is pressed from the operation keys KD, KU, KS, KM, KE, KC. Then, according to the character data stored in the buffer RAM 24, the first page of the table of contents is displayed, as illustrated in FIG. 6A, on the display device DSP. At this time, the cursor is positioned on the first line of the menu, "1. Program Information".

In this state, the down key KD is pressed to change the state of the display device DSP from FIG. 6A to 6B and to 6C. When the up key KU is pressed, the state of the display device DSP is changed in the reverse order.

Since the weather forecasts are now to be displayed, the selection key KE is pressed while the cursor is located on "3. Weather Forecasts", as shown in FIG. 6C. Then, the first page of "3. Weather Forecasts", i.e., the contents of the weather forecasts, are displayed, as shown in FIG. 6D, and the first line is highlighted by the cursor.

The down key KD is further pressed to shift the cursor to the position where the second line "2. Tomorrow's Weather" is indicated, as illustrated in FIG. 6E. Then, the selection key KE is pressed to display the first page of "2. Tomorrow's Weather", i.e., the first page of tomorrow's weather, as shown in FIG. 6F. In this hierarchical form, since there is no level lower than tomorrow's weather, the cursor is not shown on the display device DSP.

In this manner, tomorrow's weather forecasts are displayed, as illustrated in FIG. 6F. The weather forecasts shown on the display device DSP are not, however, the desired item, the down key KD is further pressed to display the second page of "2. Tomorrow's Weather", i.e., "Tomorrow's Weather Forecasts in Kanagawa", as illustrated in FIG. 6G.

In this manner, a desired text-based program can be displayed according to the above normal method.

Preset of Text-based Program

The procedure of the key operations for displaying a targeted program, as indicated by, for example, FIG. 6A to FIG. 6G, is complicated. If, however, text-based programs are preset in the following manner, a targeted program can be displayed instantly by pressing the preset key Pm.

More specifically, a desired text-based program is first selected and displayed according to the foregoing text-based program display method. In this state, the set-up key KS is pressed to enter "the selection of function" mode. In this state, the keys KD and KE are pressed to change the state of the display device DSP from FIG. 5A/FIG. 11A to FIG. 5B/FIG. 11B, i.e., the cursor is shifted to the position where the third menu item, "3. My memory set-up" is shown. Then, the selection key KE is pressed.

Then, the CPU 21 starts the routine 100 shown in FIG. 2 from step 101. In step 102, the predetermined data is fed to the memory 33 to display a message, such as the one illustrated in FIG. 5C/FIG. 11C, giving an instruction to operate the preset key Pm. It is then determined in step 103 whether one of the preset keys P1 through P7 has been pressed.

In response to the message indicated in step 102, a particular preset key Pm is pressed in step 103, and the processing proceeds to step 104. In step 104, the data area A2m corresponding to the preset key Pm pressed in step 103 is selected from the data areas A21 through A27 of the data table DTBL. Then, the frequency data N2m of the broadcast station that is receiving the broadcast program is written into the data area A2m. At the same time, the program selection information, for example, the service identity code and the program number data D2m, for designating the text-based program which is currently displayed on the display device DSP is also written into the data area A2m.

Thereafter, the processing proceeds to step 105 in which an indication is given, for example, for three seconds, that the currently receiving text-based program has been preset for the preset key Pm selected in step 103. Subsequently, in step 106 the display device DSP returns to the original state before performing the processing of "selection of function or mode" and "preset of text-based program", i.e., the original state in which the previous text-based program is displayed. The routine 100 is thus completed at step 109.

According to the foregoing procedure, the particular text-based programs can be preset for the preset keys P1 through P7.

Displaying of Preset Text-based Program

In "my memory mode", the text-based program preset for the preset key Pm according to the foregoing "preset of text-based program" is displayed in the following manner by the key operation.

More specifically, the preset key Pm for which the particular text-based program is preset is pressed while a desired broadcast program is being received. Then, the CPU 21 starts the routine 200 shown in FIG. 3 from step 201. It is then checked in step 202 whether the mode flag MFLG indicates the "area mode" (MFLG="0") or "my memory mode" (MFLG="1").

If it is found in step 202 that the mode MFLG flag indicates "my memory mode", the processing proceeds to step 203. In step 203, the data area A2m corresponding to the preset key Pm pressed when the routine 200 was started is selected from the data areas A21 through A27 of the data table DTBL. Then, the frequency data N2m is read from the data area A2m and is supplied to the tuner circuit 12 via the port 25. The frequency represented by the frequency data N1m is set in the tuner circuit 12 as the receiving frequency. In this manner, the broadcast station which is broadcasting the targeted text-based program has been selected.

Subsequently, in step 204, the program selection information, for example, the service identity code and the program number data D2m, for specifying the text-based program is read from the data area A2m selected in step 203. The character data of the text-based program represented by the data D2m is read from the buffer RAM 24 and is fed to the memory 33. Thus, the desired text-based program has been selected and displayed. Thereafter, the routine 200 is completed at step 209.

If it is found in step 202 that the mode flag MFLG indicates the "area mode", the processing proceeds to step 208 in which the preset broadcast station is selected as discussed above. Then, the routine 200 is completed at step 209.

As is seen from the above description, one of the preset keys P1 through P7 can be pressed to display the text-based program preset for the pressed key.

FIGS. 11A through 11D and FIGS. 12A through 12E illustrate the display state indicated in English corresponding to the display state indicated in Japanese shown in FIGS. 5A through 5D and FIGS. 8A through 8E, respectively.

Summary

According to the foregoing FM receiver, one of the preset keys P1 through P7 can be pressed only once to display a particular text-based program.

Thus, the text-based programs which are relatively frequently accessed, such as weather forecasts, can be easily displayed, thereby enhancing the ease of operation. Further, a targeted text-based program is first selected, and then, a corresponding preset key is simply pressed, thereby decreasing erroneous preset operation.

Moreover, a broadcast station and a corresponding text-based program broadcast by the station are preset as a pair, thereby increasing the efficiency in performing the preset operation. Additionally, the preset keys P1 through P7 serve both functions of selecting a particular broadcast station and a corresponding text-based program, thereby decreasing the number of keys and saving space on the panel provided for the receiver.

Other Embodiments

In the foregoing embodiment, in addition to the frequency data N11 through N27, the character data representing the broadcast stations may be written into the data areas A11 through A27 of the data table DTBL, and the name of the selected broadcast station may be displayed on the display device DSP by using the character data.

Further, although in the foregoing embodiment the set-up key KS is used for setting the various modes, mode keys may be provided and pressed to switch the mode flag MFLG between "0" and "1". Similarly, preset keys may be provided and operated to preset the broadcast stations or the text-based programs.

As is seen from the foregoing description, the present invention offers the following advantages. Desired text-based programs are preset for the respective preset keys so as to instantly display a particular text-based program, thereby enhancing the ease of operation. Moreover, a broadcast station and a text-based program are preset as a pair, thereby increasing the efficiency in performing the key operation.

What is claimed is:

1. An FM receiver for receiving a text-based multiplex broadcast in which text-based data is multiplexed with a sound broadcast program signal and a resulting multiplex signal is broadcast, said receiver comprising:

a receiving circuit for receiving said text-based multiplex broadcast;

a decoder circuit for extracting said text-based data from said text-based multiplex broadcast received by said receiving circuit;

a display device for displaying information concerning said text-based data;

a plurality of preset keys;

a storage device for storing in a data area data concerning a broadcast station broadcasting a selected broadcast and said text-based data; and control means connected to control said storage device for storing data when information concerning said text-based data of said selected broadcast is displayed on said display device and one of said plurality of preset keys is operated during a preset operation, said data for specifying said selected broadcast station and said data for specifying said displayed text-based data stored in said data area of said storage device corresponding to said one of said plurality of preset keys, and said control means further adds out data when said one of said plurality of preset keys is operated to receive said text-based data by reading said data for specifying said selected broadcast station and said data for specifying said text-based data from said data area corresponding to said one of said plurality of preset keys.

2. An FM receiver for receiving a text-based multiplex broadcast in which text-based program data is multiplexed with a sound broadcast program signal and a resulting multiplex signal is broadcast, said receiver comprising:

a receiving circuit for receiving said text-based multiplex broadcast;

a decoder circuit for extracting said text-based program data from said text-based multiplex broadcast received by said receiving circuit;

a display device for displaying information concerning said text-based program data;

a plurality of preset keys;

a storing device for storing in a data area data concerning a broadcast station broadcasting a selected broadcast and said text-based program data; and control means connected to control said storing device for storing data when information concerning said text-based program data of said selected broadcast is displayed on said display device and one of said plurality of preset keys is operated during a preset operation, said data for specifying said selected broadcast station and said data for specifying said displayed text-based program data is stored in said data area of said storage device corresponding to said one of said plurality of preset keys, and said control means further reads out data when said one of said plurality of preset keys is operated to receive said text-based program data by reading said data for specifying said selected broadcast station and said data for specifying said text-based program data from said data area corresponding to said one of said plurality of preset keys, thereby causing said display device to display said text-based program data of said selected broadcast station in accordance with the read out data.

3. The FM receiver according to claim 1, wherein said data for specifying the selected broadcast station includes frequency data, and said data for specifying displayed text-based data includes program selection information.

4. The FM receiver according to claim 2, wherein said data for specifying the selected broadcast station includes frequency data, and said data for specifying displayed text-based data includes program selection information.

* * * * *